United States Patent [19]

Nelson

[11] Patent Number: 5,361,988

[45] Date of Patent: Nov. 8, 1994

[54] VEHICLE MOUNTED PARTICULATE MATERIAL SPREADER

[76] Inventor: Donald F. Nelson, 305 - 4311 - 73rd Street N.W., Calgary, Alberta, Canada, T3B 2M2

[21] Appl. No.: 148,221

[22] Filed: Nov. 8, 1993

[51] Int. Cl.$^5$ .............................................. E01C 19/20
[52] U.S. Cl. .................................... 239/71; 239/72; 239/684; 239/687; 239/689; 222/413; 198/676
[58] Field of Search ................. 239/71, 72, 74, 681, 239/684, 687, 689; 222/64, 39, 23, 413; 198/676, 671

[56] References Cited

U.S. PATENT DOCUMENTS

| | | | |
|---|---|---|---|
| 1,751,928 | 3/1930 | Lachner | 239/687 |
| 2,088,285 | 7/1937 | Bögvad | 239/687 |
| 2,397,305 | 3/1946 | Wheat | 198/676 |
| 2,687,307 | 8/1954 | Austermiller | 239/687 |
| 3,194,385 | 7/1965 | Barnese | 198/671 |
| 3,333,679 | 8/1967 | Zimmermann et al. | 198/671 |
| 3,819,120 | 6/1974 | Walker | 239/684 |
| 4,166,581 | 9/1979 | Hetrick | 239/687 |
| 4,556,243 | 12/1985 | Cervinka | 239/689 |
| 5,090,626 | 2/1992 | Platsch | 239/71 |
| 5,143,289 | 9/1992 | Gresham et al. | 239/687 |

FOREIGN PATENT DOCUMENTS

| | | | |
|---|---|---|---|
| 45777 | 5/1932 | Denmark | 239/684 |
| 408481 | 1/1991 | European Pat. Off. | 239/687 |
| 2278238 | 2/1976 | France | 239/689 |

Primary Examiner—Karen B. Merritt

[57] ABSTRACT

A spreader to be mounted on a vehicle. The spreader has a main container to hold a particulate material and an outlet for a particulate material. The particulate material can be dispersed from the outlet and there is an electric motor adjacent the main body to drive the particulate material from the body. This electric motor has a drive shaft that extends to an outlet. There is a feeder, for example a screw conveyor, on the drive shaft to force the particulate material from the outlet when the shaft rotates. The spreader includes seals to prevent leaking of the particulate material from the body when the shaft is not rotating and also has the ability to warn when the level of particulate material in the main body is too low.

6 Claims, 3 Drawing Sheets

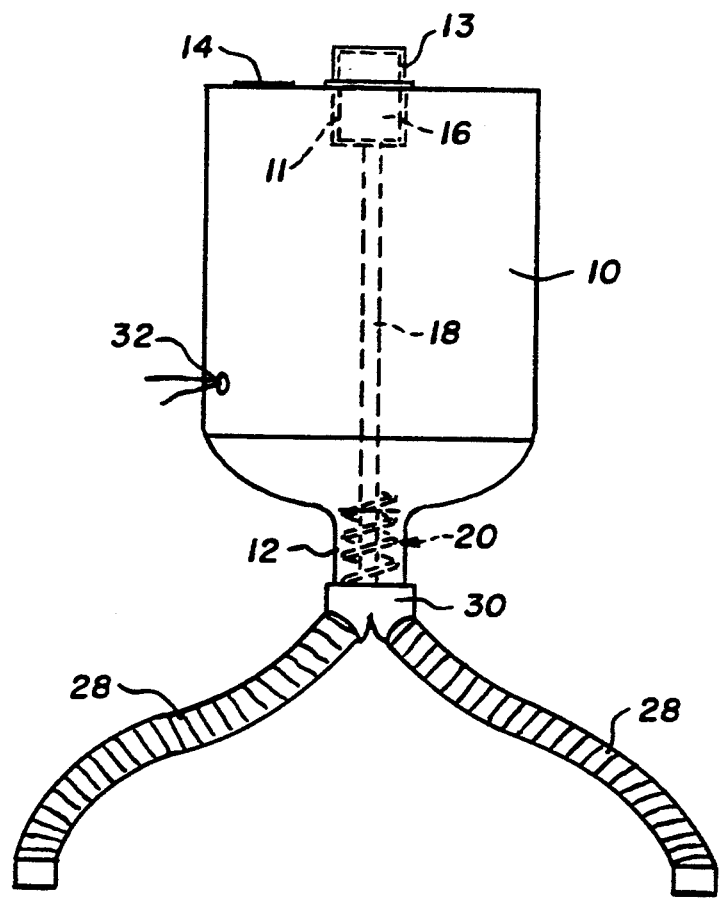
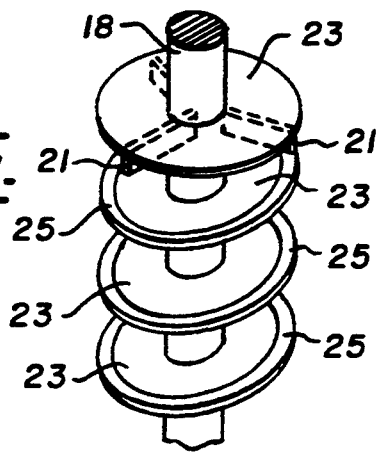

VEHICLE MOUNTED PARTICULATE MATERIAL SPREADER

FIELD OF THE INVENTION

This invention relates to a spreader to be mounted on a vehicle.

DESCRIPTION OF THE PRIOR ART

It is standard practice in parts of the world where snow is expect to spread salt, sand, gravel and the like on the roads to alleviate the effects of freezing. Salt is applied to lower the melting point of snow and ice, sand and gravel are often spread on hard packed snow or ice to provide grip for tires. It is frequently common to spread salt mixed with sand or gravel. Sand or gravel provides grip until the salt is able to bring about the melting of the snow or ice by lowering the melting point to a temperature below ambient temperature.

It has been suggested in the past to mount spreaders on an individual vehicle. Most sand, salt gravel and like is spread by quite large vehicles equipped to carry large quantities of the material to be spread. The patent literature has a number of suggestions for mounting the spreader on an individual vehicle, that is an individual vehicle carries its own, relatively small supply of material to be spread when the vehicle encounters a slippery surface.

Prior art known to applicant includes U.S. Pat. No. 3,140,110 to Wonner; U.S. Pat. No. 534,798 to Howard; U.S. Pat. No. 4,114,932 to Freeberg; U.S. Pat. No. 802,230 to Moss; U.S. Pat. No. 2,084,895 to Dempsey; U.S. Pat. No. 1,354,570 to Lamping et al.; U.S. Pat. No. 1,424,412 to Johnson; U.S. Pat. No. 1,678,604 to Reed; U.S. Pat. No. 2,672,361 to Werbe; U.S. Pat. No. 2,999,711 to Sturmer; and U.S. Pat. No. 4,316,625 to Goon et al.

Of these patents Wonnet distributes directly at the rear wheels of a vehicle. Wormer also includes a skid detection device and automatic operation of the spreader when a skid is detected. Howard is to a spreader for use on railways. Freeberg deposits sand onto the wheel of a vehicle. Moss locates a distributor more or less in the middle of a vehicle and Dempsey feeds sand adjacent the wheels. Dempsey adds a considerable structure to an existing vehicle.

Lamping shows the use of solenoid valves and uses exhaust gas for the distribution of the anti-slip material. Johnson again uses exhaust gas to operate a spreader and Reed uses compressed air. Werbe feeds sand to the rear wheels and does so from the trunk of a vehicle. Again, air is used to spread the sand. Sturmer uses a blower to distribute sand directly to the rear wheels and Goon sprays salt as a de-icing material. Goon uses an air blow to spread a salt solution.

SUMMARY OF THE INVENTION

The present invention seeks to produce a simple, practical device that can be mounted to a vehicle, for example a typical family car, either in the factory or later, by the private owner. The device is simple in structure and spreads material in such a way that it is of value to all four wheels.

Accordingly, and in a first aspect, the present invention is a spreader to be mounted on a vehicle and comprising a main container to hold a particulate material and having an outlet for the particulate material; means to disperse the particulate material from the outlet; an electric motor adjacent the main body; a drive shaft extending from the electric motor to the outlet; feed means on the drive shaft to force particulate material from the outlet when the shaft rotates; means to prevent leakage of the particulate material from the body when the shaft is not rotating; and means to warn when the level of particulate material in the main body is below a certain level.

DESCRIPTION OF THE DRAWINGS

The invention is illustrated in the drawings in which:

FIG. 4 shows a further embodiment of the invention; and

FIG. 5 shows a screw conveyor useful in the invention.

DESCRIPTION OF THE PREFERRED EMBODIMENTS

The drawings show a spreader to be mounted on a vehicle and comprising a container 10 to hold a particulate material. There is an outlet 12 for particulate material and dispersal means to disperse the particulate material from the outlet 12. The container 10 is shown including an inlet 14 for particulate material in its top. A vent 15 is shown in inlet 14.

Figure 1:
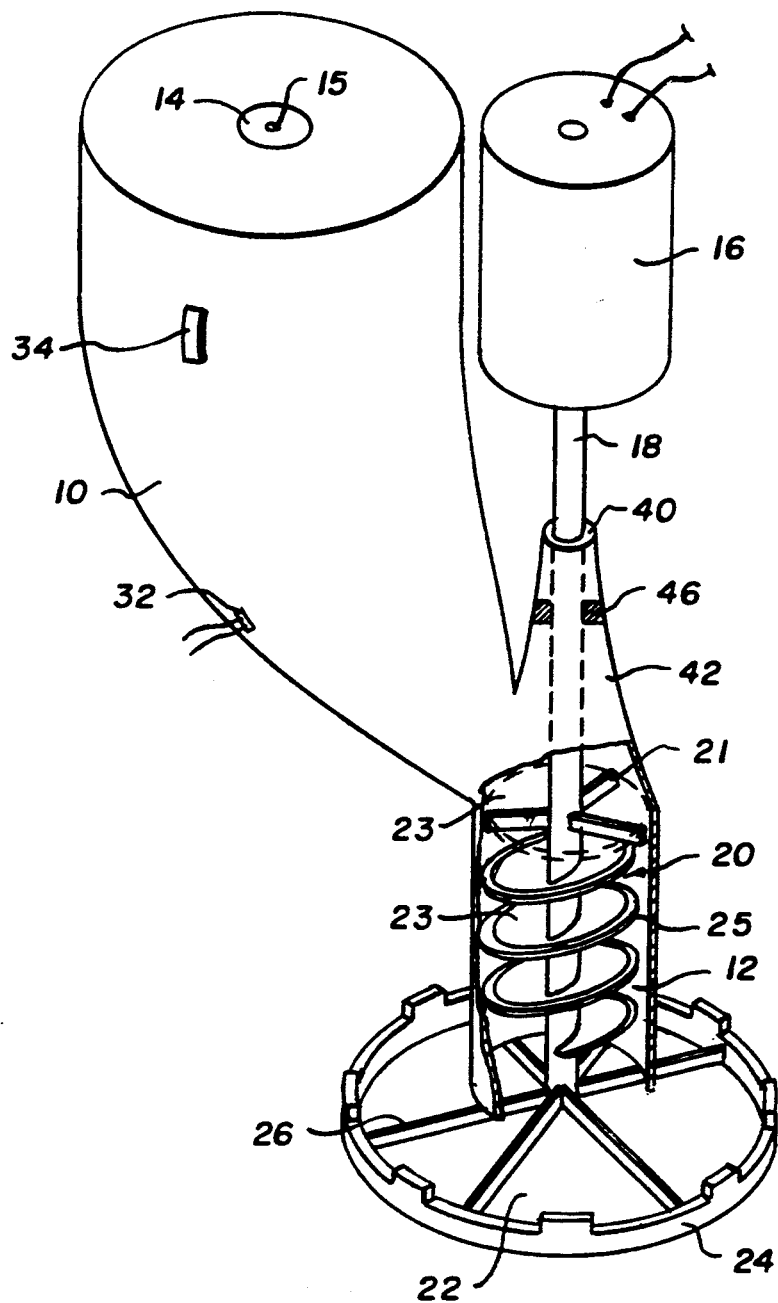
FIG. 1 illustrates a first embodiment of a spreader according to the present invention.

There is an electric motor 16 adjacent the container 10. In the embodiment of FIG. 1 the electric motor is separate, but close to the container 10 and in FIG. 2 the electric motor 16 is mounted in a depression 11 in the top of the container 10. A cap 13 is provided.

In both cases a drive shaft 18 extends from the electric motor 16 to the outlet 12.

The drawings show feed means for the particulate material on the shaft 18 as being a screw conveyor 20. The invention has means to prevent leakage of the particulate material when the shaft 18 is not rotating. Typically the means will comprise at least one flap 21 (three are shown), for example of rubber, located within the conveyor 20 through which material can be forced when the shaft 18, and thus the conveyor 20, is turning but which acts to prevent the escape of particulate material when they are not turning. The flaps extend from the shaft to an inner periphery of the outlet. The screw conveyor 20 has discs 23 mounted on the shaft 18. The upper disc 23 is not as inclined as the other discs 23 to assist in preventing leaking. Further, each disc 23 has a flexible periphery 25, for example of rubber, to provide a close fit in outlet 12.

Figure 2:
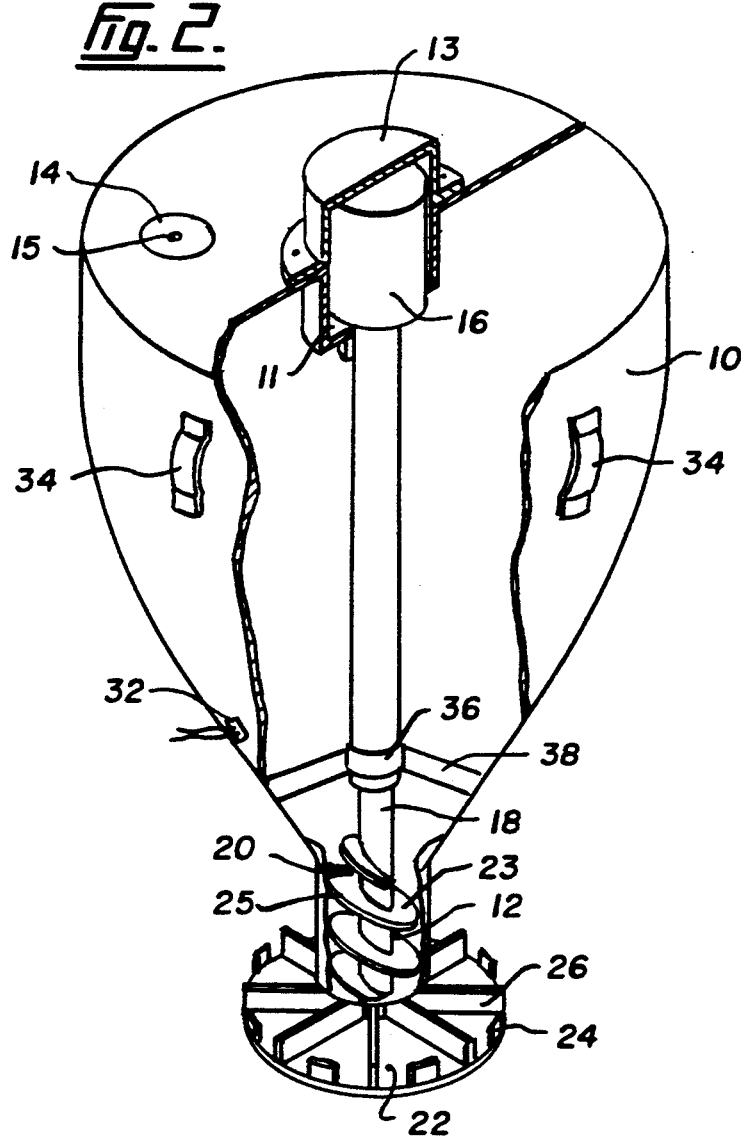
FIG. 2 is a view similar to FIG. 1 but shows a further embodiment of the invention.
Figure 3:
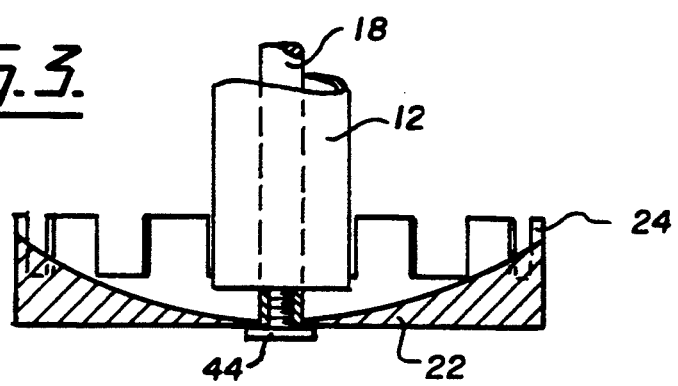
FIG. 3 is a detail of the spreader of FIG. 2.

The dispersal means is shown as a plate 22 in FIGS. 1, 2 and 3 having an upstanding peripheral wall 24 and formed with radial upstanding walls 26 to direct the particulate material and to ensure its dispersal when the material is fed by the screw conveyor 20 onto the plate 22. Plate 22 may be formed with an upper disc or lid to prevent the particulate material being dispersed upwardly.

FIG. 4 shows the use of tubes 28 connected to a manifold 30 and able to disperse particulate material directly to two wheels of the vehicle. FIG. 4 shows the use of two tubes 28, of course, four tubes will be equally appropriate.

FIG. 4 could be modified by the deletion of the electric motor, the drive shaft and the screw conveyor. It is envisaged that a simple flap valve, operable by a Bowden cable or by an electric motor, could be positioned in outlet 12 and gravity feed of the material from the container 10 would then be sufficient to disperse the particulate material. However the driven system displayed is preferred.

The invention includes means to warn when the level of particulate material in the main body is too low. In this regard, a mere diagrammatic representation of a switch 32 is shown. The switch is operable by the pressure of the particulate material in the container 10. When that pressure is released the switch is activated to tell the driver of the vehicle that the level of particulate material is too low. Typically switch 32 will be formed by spring loaded plates urged apart by a light spring. The weight of material overcomes the spring when the container 10 is full. However, when container 10 is low in particulate material, the spring urges the plates apart to complete or break a circuit. An alarm of some sort, for example a buzzer or a light, can then be activated on the vehicle dash.

FIG. 3 shows a detail of an embodiment useful in preventing leakage. Plate 22 is formed with a concave upper surface and the outlet tube 12 extends well into the concave depression, close to the plate 22. This arrangement ensures that when plate 22 is not rotating sand builds up to the level of the periphery of the plate 22. The weight of the particulate material in the plate 22 prevents further particulate material passing from the outlet 12 into the plate 22. This also ensure that supplies of particulate material is available immediately upon rotation of the plate 22. FIG. 3 shows the location of the plate 22 by the use of screw 44 engaging a threaded opening in the end of shaft 18.

FIGS. 1 and 2 show, diagrammatically loops or clips 34 that may be used to mount the spreader on a vehicle body. Any simple method or attachment is appropriate. It is desirable that the spreader of the present invention be portable so that it may be moved between vehicles rapidly and easily. FIG. 1 also shows the use of bearing 46 as additional support for the shaft 18.

FIG. 2 shows the mounting of the electric motor on the shaft 18 and the supporting of that shaft by a sleeve 36, mounted by brackets 38 extending from the interior of the container 10. Such an arrangement is, of course, unnecessary in the embodiment of FIG. 1 where the guiding of the shaft 18 is provided at 40 in an antechamber 42 to the container 10.

The use of the present invention is simple. When the driver of the vehicle determines that conditions merit it, a switch on the dashboard of the vehicle is operated and the electric motor 16 is driven from the car's battery. The shaft 18 is rotated and thus the screw conveyor 20. Particulate material, whether it be sand, salt, gravel or the like, is fed to the plate 22 by the screw conveyor. The plate 22, of course, also rotates with the shaft 18 and the plate acts to spread the particulate material under the underside of the car. In the case of FIG. 4 the disc is not present and the sand is simply directed to whichever of the four wheels the tube 28 lead to.

The present invention is thus simple to operate and effective. Particular advantages of the apparatus of the present invention include the presence of screw conveyor 12, which avoids the leaking of the sand when the device is not in operation and the ability to warn the driver of the vehicle that the level of particulate material in the main body is too low. The device is lightweight, portable, and compact. It can be moved easily between vehicles in less then 15 minutes. The method of mounting is deliberately kept simple to facilitate this portability.

Although the forgoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims.

I claim:

1. A spreader to be mounted on a vehicle and comprising:
    a container to hold a particulate material and having an outlet for the particulate material;
    means to disperse the particulate material from the outlet;
    an electric motor adjacent the container;
    a drive shaft extending from the electric motor to the outlet;
    a screw conveyor on said drive shaft to force particulate material from the outlet when the shaft rotates, said screw conveyor comprising a plurality of inclined circular bodies mounted on the shaft, at least an upper circular body being less inclined then the remaining circular bodies to act as a seal for the outlet when the shaft does not rotate, said circular bodies having flexible peripheries to facilitate sealing;
    at least one flap extending from one circular body to act to seal said conveyor when said shaft does not rotate; and
    means to warn when the level of particulate material in the container is too low.

2. A spreader as claimed in claim 1 in which the container includes an inlet for particulate material.

3. A spreader as claimed in claim 1 in which the means to warn of low level of particulate material is a switch mounted in the container and responsive to the weight of the particulate material above the switch.

4. A spreader as claimed in claim 1 in which the means to disperse the particulate material from the outlet is a disc mounted on the shaft and having upstanding walls to direct the particulate material.

5. A spreader as claimed in claim 1 in which the means to disperse the particulate material from the outlet comprises at least one tube able to be directed to a wheel of the vehicle.

6. A spreader as claimed in claim 1 in which said at least one flap comprises three flaps, extending from the shaft to an inner periphery of the outlet, the flaps being arranged radially on said one circular body.

* * * * *